US012559024B2

(12) United States Patent
Adachi

(10) Patent No.: US 12,559,024 B2
(45) Date of Patent: Feb. 24, 2026

(54) VEHICLE CONTROL DEVICE, VEHICLE CONTROL METHOD AND PROGRAM

(71) Applicant: TOYOTA JIDOSHA KABUSHIKI KAISHA, Toyota (JP)

(72) Inventor: Masahiko Adachi, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 30 days.

(21) Appl. No.: 18/624,316

(22) Filed: Apr. 2, 2024

(65) Prior Publication Data

US 2024/0336189 A1 Oct. 10, 2024

(30) Foreign Application Priority Data

Apr. 5, 2023 (JP) ................................. 2023-061183

(51) Int. Cl.
B60Q 1/50 (2006.01)
G08G 1/16 (2006.01)

(52) U.S. Cl.
CPC ............. B60Q 1/543 (2022.05); G08G 1/167 (2013.01)

(58) Field of Classification Search
None
See application file for complete search history.

(56) References Cited

U.S. PATENT DOCUMENTS

| | | | | |
|---|---|---|---|---|
| 10,698,404 B2 * | 6/2020 | Nelson | ...................... | B60Q 1/46 |
| 10,793,147 B2 | 10/2020 | Kaminade et al. | | |
| 10,870,349 B2 | 12/2020 | Uejima | | |
| 10,953,883 B2 | 3/2021 | Sakaguchi | | |
| 10,981,569 B2 | 4/2021 | Hashimoto et al. | | |
| 11,014,563 B2 | 5/2021 | Hashimoto et al. | | |
| 11,072,334 B2 | 7/2021 | Aoki et al. | | |
| 11,267,473 B2 | 3/2022 | Takahashi | | |
| 11,279,360 B2 | 3/2022 | Fukuda et al. | | |
| 2005/0015203 A1 * | 1/2005 | Nishira | .................. | B60W 50/16 |
| | | | | 340/436 |
| 2010/0253594 A1 * | 10/2010 | Szczerba | ................ | G08G 1/167 |
| | | | | 345/7 |
| 2015/0070194 A1 * | 3/2015 | Jo | ........................... | G08G 1/167 |
| | | | | 340/905 |
| 2016/0375768 A1 * | 12/2016 | Konet | .................... | B60K 35/22 |
| | | | | 348/148 |
| 2019/0143983 A1 * | 5/2019 | Hashimoto | .......... | G05D 1/0088 |
| | | | | 701/23 |
| 2019/0315362 A1 * | 10/2019 | Um | ........................ | B60W 50/10 |

(Continued)

FOREIGN PATENT DOCUMENTS

| | | |
|---|---|---|
| JP | 2018-140750 A | 9/2018 |
| JP | 2020-189543 A | 11/2020 |
| JP | 2021-060819 A | 4/2021 |

*Primary Examiner* — Muhammad Adnan
(74) *Attorney, Agent, or Firm* — Oliff PLC

(57) ABSTRACT

To effectively notify other vehicles around own vehicle that LCA is canceled, provided is a vehicle control device configured to execute a lane change assist control for automatically changing a lane from a lane traveling on a own vehicle to a target lane adjacent to the lane. The vehicle control device is configured to cancel the lane change assist control, when a predetermined cancellation condition is satisfied during a execution of the lane change assist control, and execute a cancel notification process for notifying an another vehicle of the fact that the lane change assist control has been canceled.

4 Claims, 6 Drawing Sheets

(56) References Cited

U.S. PATENT DOCUMENTS

| | | | |
|---|---|---|---|
| 2020/0070889 A1 | 3/2020 | Fukuda et al. | |
| 2020/0247400 A1 | 8/2020 | Fujii | |
| 2020/0282998 A1* | 9/2020 | Yashiro | ................. B60W 50/14 |
| 2020/0369281 A1 | 11/2020 | Sato | |
| 2021/0101600 A1 | 4/2021 | Kato et al. | |
| 2021/0146928 A1* | 5/2021 | Clarke | ............. B60W 30/0953 |
| 2024/0278716 A1* | 8/2024 | Mouri | ................... B60Q 1/381 |

* cited by examiner

VEHICLE CONTROL DEVICE, VEHICLE CONTROL METHOD AND PROGRAM

CROSS-REFERENCE TO RELATED APPLICATION

This application claims priority to Japanese Patent Application No. JP2023-061183 filed on Apr. 5, 2023, the content of which is hereby incorporated by reference in its entirety into this application.

BACKGROUND OF THE INVENTION

1. Field of the Invention

The present disclosure relates to a vehicle control device, a vehicle control method and a program.

2. Description of the Related Art

There is known a control device for a vehicle that performs lane change assist control (LCA), which automatically changes the vehicle from the lane in which it is traveling to an adjacent target lane. For example, Japanese Patent Application Laid-Open (kokai) No. 2021-060819 discloses a device in which, when a predetermined cancel condition is satisfied while LCA is being executed, the time for determining to cancel the LCA is being changed depending on whether or not the lane change destination is notified to the outside of the vehicle by the blinking of the turn signal.

In the device disclosed in Patent Document 1, when the cancel condition of LCA is satisfied during the blinking of the direction indicator, LCA is kept in a standby state while the blinking of the direction indicator is continued until a predetermined time elapses from the time when the cancel condition is satisfied. Furthermore, if the cancel condition is still satisfied at the time point when the predetermined period of time has elapsed, the turn indicator is turned off, and LCA in the standby state is terminated without resuming, that is, LCA is terminated.

For this reason, for example, when there is a rear vehicle traveling in the target lane, the driver of the rear vehicle seems to have tried to interrupt the target lane while blinking the direction indicator, and own vehicle seems to give up the lane change and return to the original lane. In such cases, the driver of the rear vehicle may not be able to understand the intent of behavior of own vehicle. Consequently, even if own vehicle has determined that LCA has been cancelled, the drivers of the rear vehicle may be cautious of the unpredictable behavior of own vehicle and may prevent the rear vehicle from traveling, such as unnecessary deceleration. In other words, if the own vehicle cancels LCA, it is desirable to effectively notify other vehicles around own vehicle that LCA is canceled.

SUMMARY OF THE INVENTION

It is an object of the present disclosure to effectively notify other vehicles around own vehicle that LCA is canceled.

A device according to at least one embodiment of the present disclosure is a vehicle control device configured to execute a lane change assist control for automatically changing a lane from a lane traveling on a own vehicle to a target lane adjacent to the lane. The vehicle control device is configured to cancel the lane change assist control, when a predetermined cancellation condition is satisfied during execution of the lane change assist control, and execute a cancel notification process for notifying the other vehicles of the fact that the lane change assist control has been canceled.

DESCRIPTION OF THE EMBODIMENTS

Description is now given of a vehicle control device, a vehicle control method and a program according to at least one embodiment of the present disclosure with reference to the drawings.

Hardware Configuration

Figure 1:
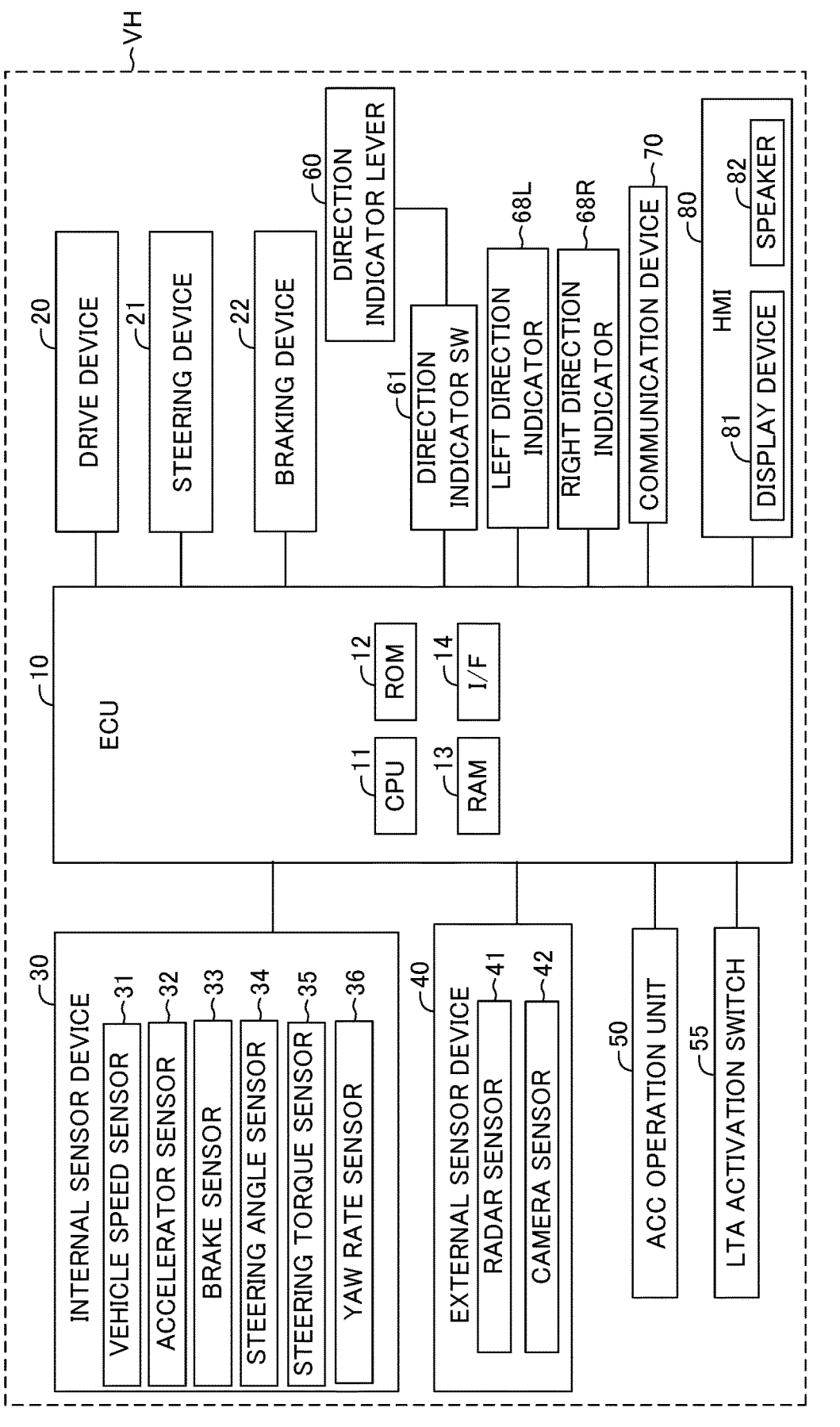
FIG. 1 is a schematic diagram showing a hardware configuration of a vehicle according to the present embodiment.

FIG. 1 is a schematic diagram of a hardware configuration of a vehicle VH to which the control device according to the present embodiment is applied. Hereinafter, the vehicle VH may be referred to as an own vehicle when it is required to distinguish it from other vehicles.

The vehicle VH has an ECU (Electronic Control Unit) 10. The ECU 10 includes a CPU (Central Processing Unit) 11, ROM (Read Only Memory) 12, RAM (Random Access Memory) 13, an interface device 14, and the like. The CPU 11 executes various programs stored in the ROM 12. The ROM 12 is a non-volatile memory that stores data and the like required for the CPU 11 to execute various programs. The RAM 13 is a volatile memory to provide a working region that is deployed when various programs are executed by the CPU 11. The interface device 14 is a communication device for communicating with an external device.

The ECU 10 is a central device which executes driving assist control of the vehicle VH, such as LCA, an adaptive cruise control (ACC), a lane trace assist (LTA), and the like. The driving assist control is a concept which encompasses automatic driving control. A drive device 20, a steering device 21, a braking device 22, an internal sensor device 30, an external sensor device 40, a ACC operating unit 50, a LTA activation switch 55, a direction indicator switch 61, a direction indicator 68L, 68R, a communication device 70, a HMI (Human Machine Interface) 80, and the like are communicably connected to the ECU 10.

The drive device 20 generates a driving force to be transmitted to driving wheels of the vehicle VH. As the drive device 20, for example, an engine and a motor are given. In the device according to the at least one embodiment, the vehicle VH may be any one of a hybrid electric vehicle (HEV), a plug-in hybrid electric vehicle (PHEV), a fuel cell electric vehicle (FCEV), a battery electric vehicle (BEV), and an engine vehicle. The steering device 21 applies steering forces to steerable wheels of the vehicle VH. The braking device 22 applies a braking force to the wheels of the vehicle VH.

The internal sensor device 30 is sensors which acquire states of the vehicle VH. Specifically, the internal sensor device 30 includes a vehicle speed sensor 31, an accelerator sensor 32, a brake sensor 33, a steering angle sensor 34, a steering torque sensor 35, a yaw rate sensor 36, and the like.

The vehicle speed sensor 31 detects a travel speed (vehicle speed v) of the vehicle VH. The accelerator sensor 32 detects an operation amount of an accelerator pedal (not shown) by the driver. The brake sensor 33 detects an operation amount of a brake pedal (not shown) by the driver. The steering angle sensor 34 detects a rotational angle of a steering wheel or a steering shaft (not shown) of the vehicle VH, that is, a steering angle. The steering torque sensor 35 detects a rotational torque of a steering wheel or a steering shaft (not shown) of the vehicle VH, that is, a steering torque. The yaw rate sensor 36 detects a yaw rate of the vehicle VH. The internal sensor device 30 transmits the condition of the vehicle VH detected by the sensors 31 to 36 to the ECU 10 at a predetermined cycle.

The external sensor device 40 is sensors which acquire object information on objects around the vehicle VH. Specifically, the periphery recognition device 40 includes a radar sensor 41, a camera sensor 42, and the like. As the object information, there are given, for example, a peripheral vehicle, a traffic light, a white line of a road, a traffic sign, a fallen object, and the like.

The radar sensor 41 is provided in, for example, a front portion of the vehicle VH, and detects a target existing in a region located on the front side of the vehicle VH. The radar sensor 41 includes a millimeter wave radar or Lidar. The millimeter wave radar radiates a radio wave (millimeter wave) in a millimeter wave band, and receives the millimeter wave (reflected wave) reflected by a target existing within a radiation range. The millimeter wave radar acquires a relative distance between the vehicle VH and the target, a relative speed between the vehicle VH and the target, and the like based on a phase difference between the transmitted millimeter wave and the received reflected wave, an attenuation level of the reflected wave, a time from the transmission of the millimeter wave to the reception of the reflected wave, and the like. The Lidar sequentially scans laser light in a pulse form having a shorter wavelength than that of the millimeter wave in a plurality of directions, and receives reflected light reflected by a target, to thereby acquire a shape of the target detected in front of the vehicle VH, the relative distance between the vehicle VH and the target, the relative speed between the vehicle VH and the target, and the like.

The camera sensor 42 is, for example, a stereo camera or a monocular camera, and a digital camera including an image pickup element such as a CMOS sensor or a CCD sensor can be used as the camera sensor 42. The camera sensor 42 is arranged in, for example, a top portion of a front windshield glass of the vehicle VH. The camera sensor 42 captures a region in front of the vehicle VH, and processes captured image data, to thereby obtain the object information in front of the vehicle VH. The object information is information indicating a type of the target detected in front of the vehicle VH, the relative distance between the vehicle VH and the target, the relative speed between the vehicle VH and the target, and the like. It is only required to recognize the type of the target through, for example, machine learning such as pattern matching.

The external sensor device 40 repeatedly transmit the acquired object information to the ECU 10 each time a predetermined time elapses. The ECU 10 composes the relative relationship between the vehicle VH and the target acquired by the radar sensor 41 and the relative relationship between the vehicle VH and the target acquired by the camera sensor 42, to thereby determine a relative relationship between the vehicle VH and the target. It is not always required for the external sensor device 40 to include both of the radar sensor 41 and the camera sensor 42, and may include, for example, only the radar sensor 41 or only the camera sensor 42.

The ACC operating unit 50 includes, for example, a start switch for selecting whether to start or end ACC, a setting switch for setting a target vehicle speed and a target inter-vehicle distance of the ACC, a cancel switch for temporarily canceling the ACC being executed, a resume switch for resuming the ACC, and the like. The LTA activation switch 55 is ON/OFF switch for selecting by the driver whether the activating or terminating the LTA.

The direction indicator lever 60 is an operating device for causing by the drivers to blink the left and right direction indicator 68L, 68R. The direction indicator switch 61 detects an operation direction of the direction indicator lever 60 by the driver. When the driver operates the direction indicator lever 60 by a predetermined amount (for example, deep), the direction indicator switch 61 transmits a blinking instruction signal corresponding to the operation direction to the ECU 10. When the ECU 10 receives the blinking instruction signal, it causes the direction indicator 68L, 68R corresponding to the operating direction of the direction indicator lever 60 to blink.

The turn signal lever 60 is also used by the driver as an operating device for requiring to change the lane by LCA. Specifically, when the driver operates and holds the direction indicator lever 60 by a predetermined amount (for example, shallow), the direction indicator switch 61 transmits, to the ECU 10, a LCA request signal indicating that the driver requests a lane change to an adjoining lane (target lane) in the operation direction of the direction indicator lever 60, together with a blink instruction signal corresponding to the operation direction.

The communication device 70 is, for example, a communication device that performs V2V communication (vehicle-to-vehicle communication) between the own vehicle VH and the others vehicles. The communication device 70 can provide information of the own vehicle VH to the other vehicles through vehicle-to-vehicle communication. In the present embodiment, the information of the own vehicle VH includes, for example, a LCA cancel notification, which will be described later.

The HMI 80 is an interface for inputting and outputting data between the ECU 10 and the driver, and includes an input device and an output device. Examples of the input device include a touch panel, a switch, and a sound pickup microphone. Examples of the output device include a display device 81 and a speaker 82. The display device 81 is, for example, a center display installed in an instrument panel or the like, a multi-information display, a head-up display, a display of a navigation system, or the like. The speaker 82 is, for example, a speaker of an acoustic system or the navigation system.

Software Configuration

Figure 2A:
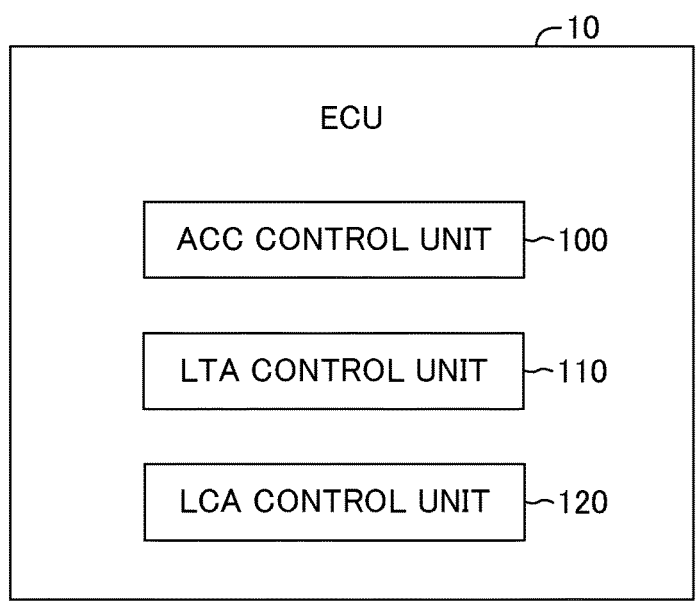
FIG. 2A is a schematic diagram showing a software configuration of a control device to the present embodiment.

FIG. 2A is a schematic diagram showing a software configuration of the ECU 10 to the present embodiment. As shown in FIG. 2A, the ECU 10 includes an ACC control unit 100, a LTA control unit 110, a LCA control unit 120, and the like as a part of functional elements. Those functional elements 100 to 120 are realized by the CPU 11 of the ECU 10 reading a program stored in the ROM 12 into the RAM 13 and executing the program. Note that all or a part of the functional elements 100 to 120 may be provided in another ECU separate from the ECU 10 or in an information processing device of a facility (a control center or the like) capable of communicating with the vehicle VH.

The ACC control unit 100 executes the ACC based on the target vehicle speed and the target inter-vehicle distance. The ACC itself is well known. Thus, a brief description is now given of the ACC. The ACC includes two types of control, namely, the constant-speed travel control and the follow-up travel control. The constant-speed travel control is control of causing the vehicle VH to travel at a constant speed in accordance with the target vehicle speed without requiring the accelerator operation of the driver. The follow-up travel control is control of causing the vehicle VH to travel such that the vehicle VH follows a preceding vehicle while maintaining the inter-vehicle distance to the preceding vehicle at the target inter-vehicle distance. The preceding vehicle is a vehicle traveling in front of the vehicle VH.

When the ACC activation switch of the ACC operation unit 50 is turned ON, the ACC control unit 100 determines whether or not there is a preceding vehicle to be followed on the basis of the object information transmitted from the external sensor device 40. When determining that the preceding vehicles do not exist, the ACC control unit 100 executes constant speed travel control. In this case, the ACC control unit 100 calculates the target acceleration from the deviation between the actual vehicle speed v and the target vehicle speed, and controls the operation of the drive device 20 and the braking device 22 based on the calculated target acceleration. The actual vehicle speed v may be acquired based on the detection result of the vehicle speed sensor 31. On the other hand, when it is determined that the preceding vehicles exist, the ACC control unit 100 executes the follow-up travel control. In this case, the ACC control unit 100 calculates the target acceleration from the deviation between the actual inter-vehicle distance and the target inter-vehicle distance, and controls the operation of the drive device 20 and the braking device 22 based on the calculated target acceleration. The actual inter-vehicle distance between the own vehicle VH and the preceding vehicle may be acquired based on the detection result of the external sensor device 40.

The LTA control unit 110 executes the LTA for automatically changing the steering angle (steered wheel turning angle) so that a lateral position of the own vehicle VH is maintained in the vicinity of the target traveling lane. Here, the lateral position of the own vehicle VH is a position (for example, a center of gravity position) of the own vehicle VH in the lane-width direction with respect to the road. The LTA itself is well known. Thus, a brief description is now given of the LTA. When the LTA activation switch 65 is turned ON while ACC is being performed by the ACC control unit 100, the LTA control unit 110 sets the target traveling line of the vehicle VH on the basis of either one or both of the white line recognized by the external sensor device 40 or the traveling trajectory of the following target vehicle (that is, the preceding vehicle) by ACC. The traveling trajectory of the following target vehicle may be acquired based on the object information transmitted from the external sensor device 40. The LTA control unit 110 changes the steering angle of the vehicle VH by controlling the operation of the steering device 21 so that the lateral position of the vehicle VH is maintained near the target traveling line in the traveling lane.

The LCA control unit 120 executes the LCA of controlling the operation of the driving device 20, the steering device 21, and the braking device 22 so as to move from the lane (hereinafter, the original lane) where the own vehicle VH is currently traveling to the lane (hereinafter, the target lane) adjacent to the original lane, and assisting the steering operation of the drivers. The LCA itself is well known. Thus, a brief description is now given of the LCA. The LCA is to be executed on behalf of the LTA in the same way as the own vehicle VH in the control of the lateral position relative to the lane, when a request for assistance from the drivers is received during the execution of the LTA and the ACC. For example, the LCA control unit 120 executes the LCA when the following execution-permission conditions are satisfied.

(1). Receiving the LCA request signal from the turn signal switch 61.

(2). Both the ACC start switch and the LTA start switch 55 are turned ON.

(3). The white line, which is the boundary between the original lane and the target lane, is a broken line.

(4). The external sensor device 40 does not detect an obstacle such as another vehicle that obstructs lane change in the target lane.

(5). The vehicle speed v of the own vehicle VH is within the specified allowable speed range.

Note that the execution-permission conditions (1) to (5) are examples and may not include some conditions, or may further include other conditions (for example, a type of a road such as an automobile dedicated road).

When at least the execution-permission condition (1) is satisfied, the LCA control unit 120 starts blinking of the direction indicator 68L, 68R for the direction of the target lane. Further, the LCA control unit 120 determines that the condition for starting the lane change (lateral movement) is satisfied when the state in which all the execution-permission conditions (1) to (5) are continuously satisfied predetermined thresholds Tv. When the start condition is satisfied, the LCA control unit 120 transmits a LCA start guidance display command to the display device 81. As a result, the LCA starting guidance is displayed on the display device 81.

Figure 2B:
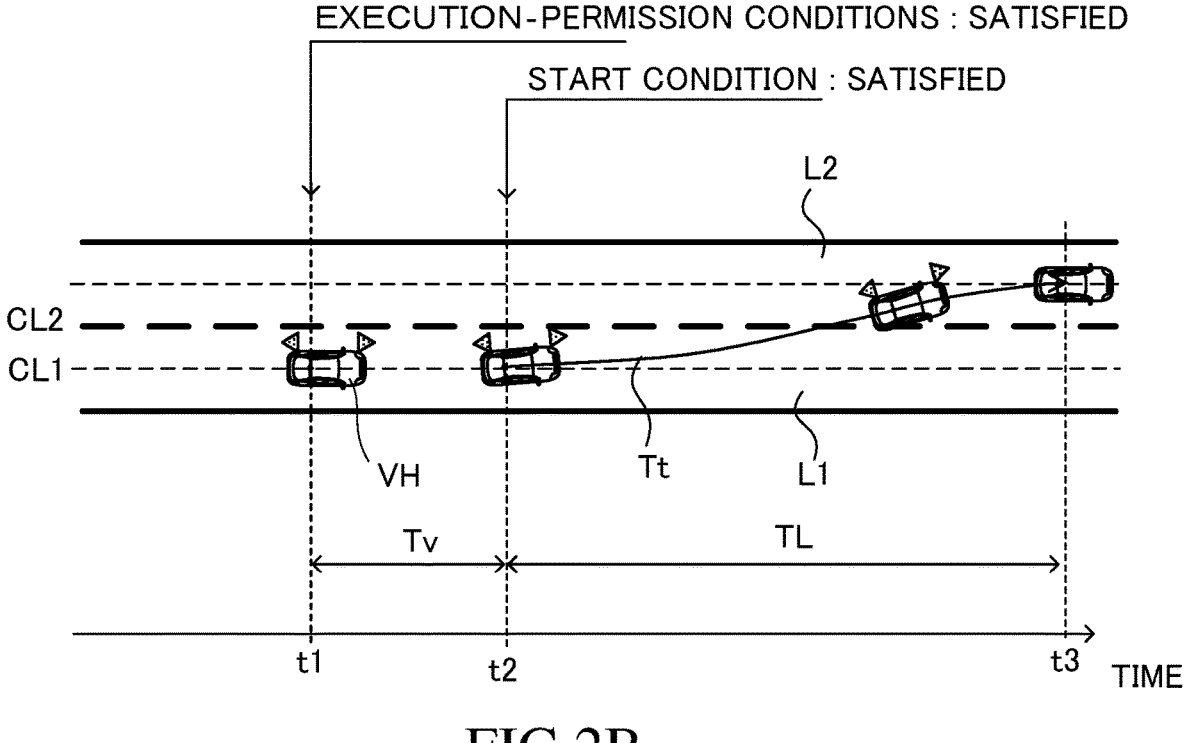
FIG. 2B is a schematic diagram showing an example of the target trajectory of LCA.

The LCA control unit 120 calculates a target trajectory that determines a target trajectory of the own vehicle VH. The target trajectory Tt is, for example, a shape as shown in FIG. 2B, and is a trajectory for moving the own vehicle VH from the original lane L1 to the widthwise center position CL2 (hereinafter, the final target lateral position) of the target lane L2 over the target lane change time TL. Note that the time t1 to t2 in FIG. 2B indicates a time period in which all of the execution-permission conditions (1) to (5) are satisfied. The target trajectory function is a function for calculating the target lateral position y, the target lateral velocity vy, and the target lateral acceleration ay of the own vehicle VH corresponding to the elapsed time from the starting point of the lane change (that is, the time t2 at which the start condition is satisfied) with reference to the lane center line CL1 of the original lane L1. The target lane change time LT is set based on the target lateral distance required to move the own vehicle VH lateral direction from the starting position of the lane change to the final target lateral position CL2.

The LCA control unit 120 calculates the target lateral position y, the target lateral velocity vy, and the target lateral acceleration ay at the current time point on the basis of the target trajectory function and the elapsed time when the lane change starting condition is satisfied at the time t2 with the elapse of the threshold time Tv. Further, the LCA control unit 120 calculates the target yaw angle θy, the target yaw rate γ, and the target curvature Cu at the current time point based on the vehicle speed v, the target lateral speed vy, and the target lateral acceleration ay at the current time point, and calculates the target steering angle θ based on the target lateral position y, the target yaw angle θy, the target yaw rate γ, and the target curvature Cu. Then, the LCA control unit 120 controls the operation of the drive device 20, the steering device 21, and the braking device 22 based on the target lateral velocity vy, the target lateral acceleration ay, and the target steering angle θ, thereby laterally moving the own vehicle VH toward the final target lateral position CL2. As shown in the time t3 of FIG. 2B, the LCA control unit 120 transmits a LCA termination guidance display command to the display device 81 while terminating the own vehicle VH when it reaches the final target lateral position CL2 of the target lane L2. As a result, the LCA end guidance is displayed on the display device 81.

When the following cancellation conditions (1) to (5) are satisfied while the LCA is being executed, the LCA control unit 120 cancel the LCA being executed.

(1). The input of the steering torque exceeding the specified value by the driver operation is detected.

(2). The brake operation by the driver is detected.

(3). When the LCA is canceled by operating the turn signal lever 60.

(4). The white line, which is the boundary between the original lane and the target lane, is no longer a broken line.

(5). Other vehicles traveling in the target lane have come close to the own vehicle VH, and it is not possible to secure a safety distance between those vehicles.

When at least one of the cancellation conditions (1) to (5) is satisfied, the LCA control unit 120 cancel the LCA being executed. When the cancellation conditions of LCA is satisfied, the LCA control unit 120 transmits a LCA cancel guidance display command to the display device 81. As a result, a LCA cancel guidance is displayed on the display device 81. Note that the cancellation conditions (1) to (5) are examples, and may not include some conditions or may further include other conditions.

Figure 3A:
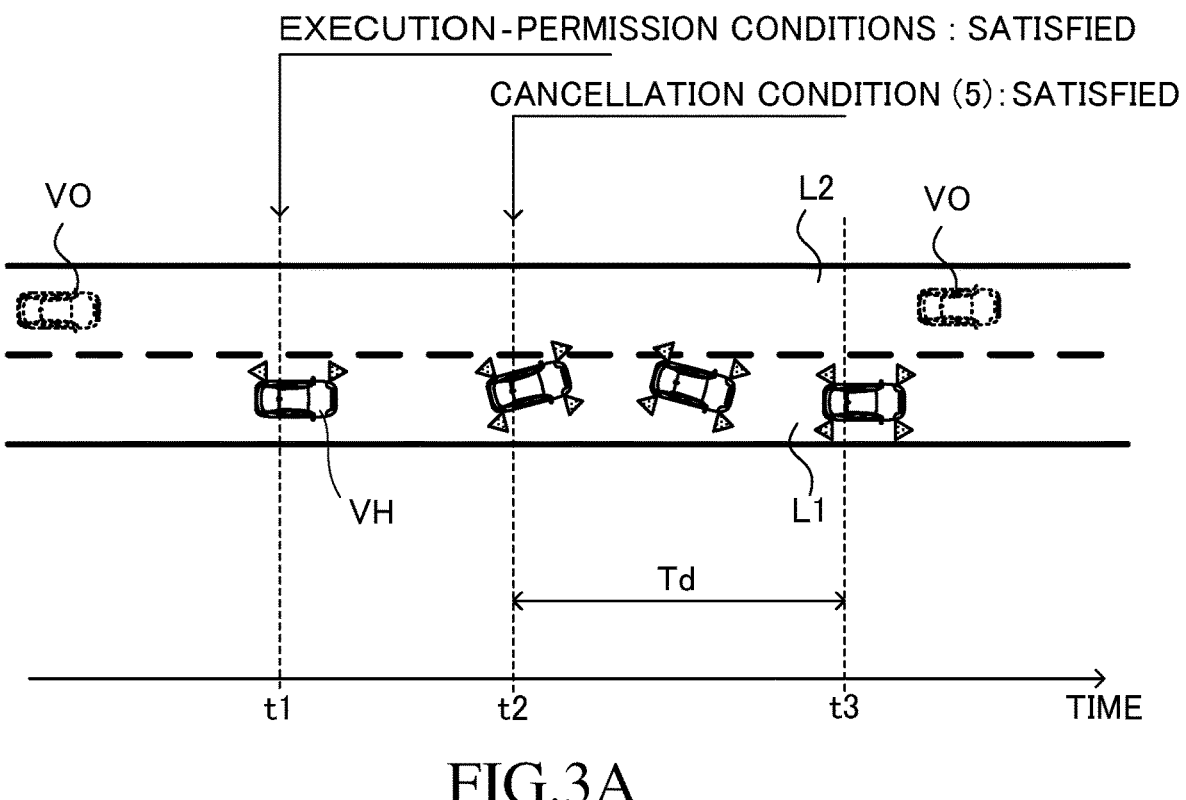
FIG. 3A is a schematic diagram for explaining the present embodiment executing the cancel notification processing.
Figure 3B:
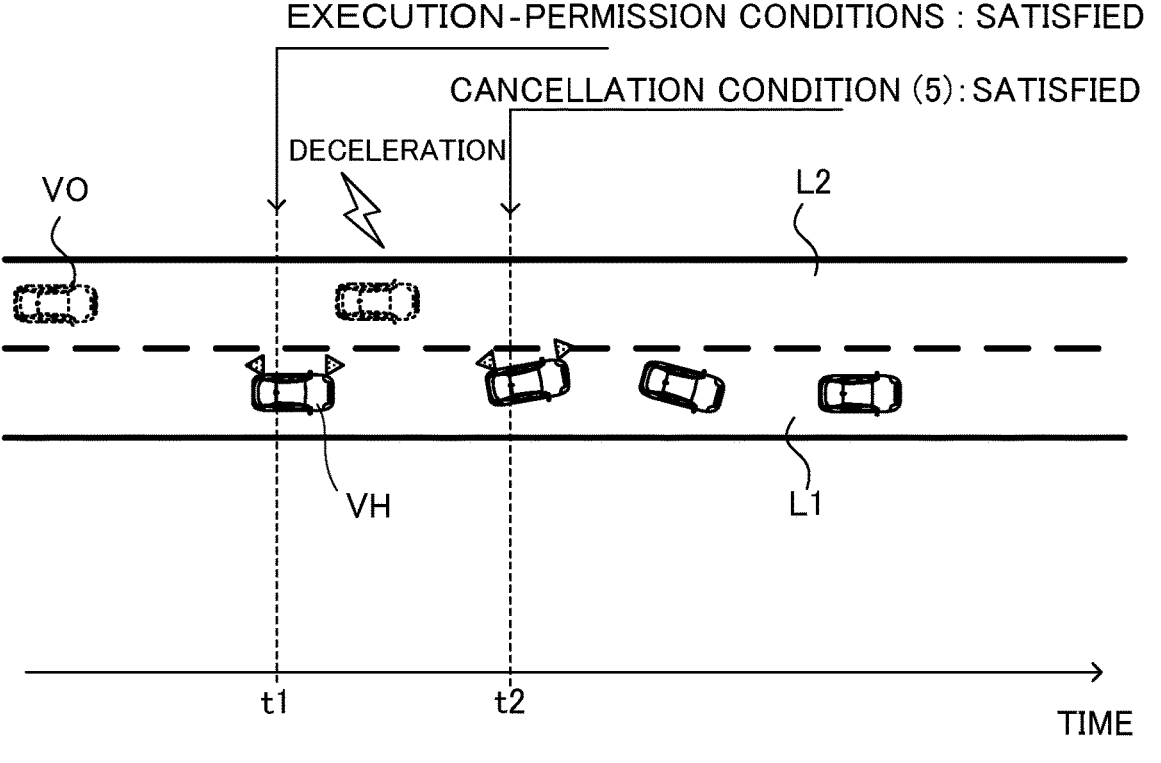
FIG. 3B is a schematic diagram for explaining a comparative example in which the cancel notification process is not executed.

Here, as shown in FIG. 3B, assuming a situation where the other vehicle VO traveling in the target lane L2 approaches the own vehicle VH from the rear. In such situation, since the cancellation condition (5) is satisfied, the own vehicle VH will cancel the LCA. Hereinafter, the other vehicle VO in which the target lane L2 approaches own vehicle VH from the rear is referred to as a "rear vehicle".

As shown in the time t1 of FIG. 3B, when the LCA control unit 120 starts LCA in response to the establishment of the execution-permission conditions (1) to (5), the direction indicator on the target lane L2 that is the lane change destination is caused to blink (in FIG. 3B, left direction indicator). However, after LCA starts, for example, when the cancellation condition (5) is satisfied at the time t2, the LCA control unit 120 cancels LCA being executed and turns off the turn indicator that has been blinking. For this reason, the driver of the rear vehicle VO seems to have tried to interrupt the target lane L2 while blinking the turn signal during the time t1 to t2 so that the own vehicle VH will give up the lane change and return to the original lane L1. In such cases, even though the own vehicle VH has cancelled LCA, the driver of the rear vehicle VO may not understand the intent of the own vehicle VH behavior and may be cautious of the unpredictable behavior of the own vehicle VH and perform unnecessary deceleration. That is, canceling LCA of the own vehicle VH may prevent the rear vehicle VO from traveling.

Therefore, the LCA control unit 120 of the present embodiment performs a cancel notification process of notifying the drivers of the rear vehicle VO of the cancel of LCA of the own vehicle VH when LCA is cancelled due to the establishment of the cancellation condition (5) and the deceleration of the rear vehicle VO is detected while the rear vehicle VO traveling in the target lane L2 is approaching while LCA is being executed.

Specifically, as shown in the time t1 of FIG. 3A, when the LCA control unit 120 starts LCA in response to the establishment of the execution-permission conditions (1) to (5), the direction indicator on the target lane L2 that is the lane change destination is caused to blink (in FIG. 3B, left direction indicator). When the cancellation condition (5) is satisfied at the time t2, the LCA control unit 120 cancel LCA being executed. At this time, when the deceleration of the rear vehicle VO is detected, the LCA control unit 120 executes the cancel notification process from the time t2 to the predetermined time Td of the time t3. The deceleration of the rear vehicle VO may be detected based on the detection result of the external sensor device 40. The predetermined time Td may be a fixed time (fixed value) or may be a variable value corresponding to the vehicle speed v of the own vehicle VH or the relative speed with respect to the rear vehicle VO.

In the embodiment shown in FIG. 3A, the LCA control unit 120 executes a cancel notification process by a hazard that causes the left and right direction indicator 68L, 68R to blink simultaneously. The method of the cancel notification process is not particularly limited as long as it can notify the drivers of the rear vehicle VO of the cancel of LCA of the own vehicle VH. For example, if the own vehicle VH includes a display on an exterior surface of the vehicle, a rear window, or the like, a message indicating that LCA is canceled may be displayed on the display. When an electronic paper capable of changing the body color or the like is attached to the outer surface of the vehicle body of the own vehicle VH, a message indicating that LCA is canceled may be displayed by the electronic paper. In addition, when the own vehicle VH includes an external speaker, LCA cancel notification may be made by sound of the external speaker. In addition, when the rear vehicle VO includes a communication device that performs the vehicle-to-vehicle communication, LCA cancel notification may be performed by the vehicle-to-vehicle communication. Further, when the direction indicator 68L, 68R of the own vehicle VH is a sequential type in which a plurality of light emitting units can be turned on in a chain, LCA cancel notification may be made by causing the direction indicator 68L, 68R to be turned on in a chain in a direction opposite to the lane change direction.

Figure 4:
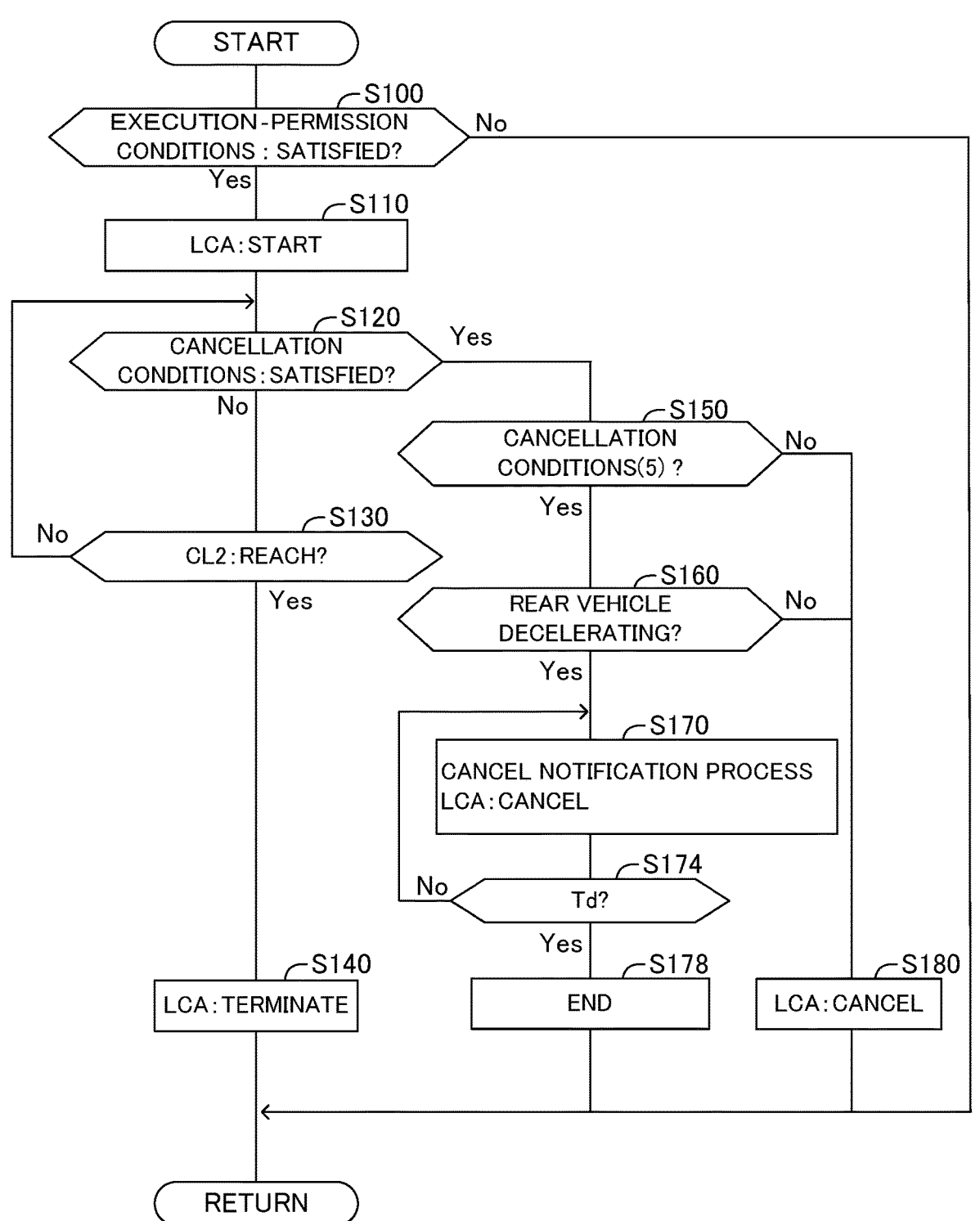
FIG. 4 is a flow chart for explaining a routine of LCA according to the present embodiment.

Next, a routine of LCA process by the CPU 11 of the ECU 10 will be described with reference to FIG. 4. This routine is started, for example, when ACC and LTA are activated.

In step S100, the ECU 10 determines whether or not the LCA execution-permission conditions (1) to (5) are satisfied. When the LCA execution-permission conditions (1) to (5) are satisfied (Yes), the ECU 10 advances the process to step S110. On the other hand, if the LCA execution-permission conditions (1) to (5) are not satisfied (No), the ECU 10 returns to this routine.

In step S110, the ECU 10 executes to start LCA. At this time, the ECU 10 also starts blinking of the direction indicator 68L, 68R on the target lane L2. Next, in step S120, the ECU 10 determines whether at least one of LCA cancellation conditions (1) to (5) is satisfied. When at least one of the cancellation conditions (1) to (5) is satisfied (Yes), the ECU 10 advances the process to step S150. On the other hand, when none of the cancellation conditions (1) to (5) is satisfied (No), the ECU 10 advances the process to step S130.

In step S130, the ECU 10 determines whether the own vehicle VH has reached the final target lateral position CL2. If the own vehicle VH has not reached the final target lateral position CL2 (No), the ECU 10 returns to the process of step S120 and continues LCA. On the other hand, when the own vehicle VH reaches the final target lateral position CL2 (Yes), the ECU 10 advances the process to step S140, terminates LCA, and returns to this routine. At this time, the ECU 10 transmits a LCA end guidance display command to the display device 81. Note that the timing at which the turn indicator 68L, 68R is turned off may be the timing at which LCA is terminated at step S140, or may be the timing at which the overall of the own vehicle VH enters the target lane L2.

When the determination of the above-described step S120 is affirmative (Yes), that is, when at least one of the cancellation conditions (1) to (5) is satisfied, the ECU 10 advances the process to step S150 and determines whether or not the reason for cancelling LCA is due to the establishment of the cancellation condition (5), that is, whether or not it is due to the approach of the rear vehicle VO. If it is not due to the approach of the rear vehicle VO (No), that is, if the reason for cancelling LCA is due to the establishment of at least one of the cancellation conditions (1) to (4), the ECU 10 advances the process to step S180, cancels LCA being executed, and returns this routine. At this time, the ECU 10 turns off the turn indicator that is blinking, and transmits a LCA cancel guidance display command to the display device 81. On the other hand, in the case of being caused by the approach of the rear vehicle VO (Yes), that is, in the case where the reason for cancelling LCA is caused by the establishment of the cancellation condition (5), the ECU 10 advances the process to step S160.

In step S160, the ECU 10 determines whether or not the rear vehicle VO has decelerated based on the outcome detected by the external sensor device 40. If the rear vehicle VO is not decelerating (No), the ECU 10 advances the process to step S180 and cancels LCA. On the other hand, when the rear vehicle VO decelerates (Yes), the ECU 10 advances the process to step S170.

In step S170, the ECU 10 executes a cancel notification process of notifying the rear vehicle VO that the own vehicle VH has canceled ACC, and cancels LCA. At this time, the ECU 10 transmits the cancel guidance display command for LCA to the display device 81. In addition, the ECU 10 may display a message indicating that the cancel notification is being made to other vehicles in the vicinity together with the cancel guidance on the display device 81.

Then, in step S174, the ECU 10 determines whether the predetermined time Td has elapsed. If the predetermined time Td has not elapsed (No), the ECU 10 returns the process to step S170. That is, the cancel notification process is continued. On the other hand, when the predetermined time Td has elapsed (Yes), the ECU 10 advance the process to step S178, ends the cancel notification process, and returns this routine.

According to the present embodiment described in detail above, the ECU 10 executes the cancel notification process of notifying the driver of the rear vehicle VO of the cancel of LCA of the own vehicle VH when the rear vehicle VO is present when LCA being executed is canceled. That is, the drivers of the rear vehicle VO can appropriately grasp the cancel of LCA of the own vehicle VH. As a result, it is possible to effectively suppress the cancellation of LCA of the own vehicle VH from affecting the traveling of the rear vehicle VO. In addition, by executing the cancel notification process only when there is a rear vehicle VO to which the cancel of LCA is to be notified, the unnecessary cancel notification can be effectively suppressed from being executed.

In the above, the vehicle control device, the vehicle control method and the program according to the at least one embodiment have been described, but the present disclosure is not limited to the above-mentioned at least one embodiment, and various modifications are possible within the range not departing from the object of the present disclosure.

Modification 1

Figure 5:
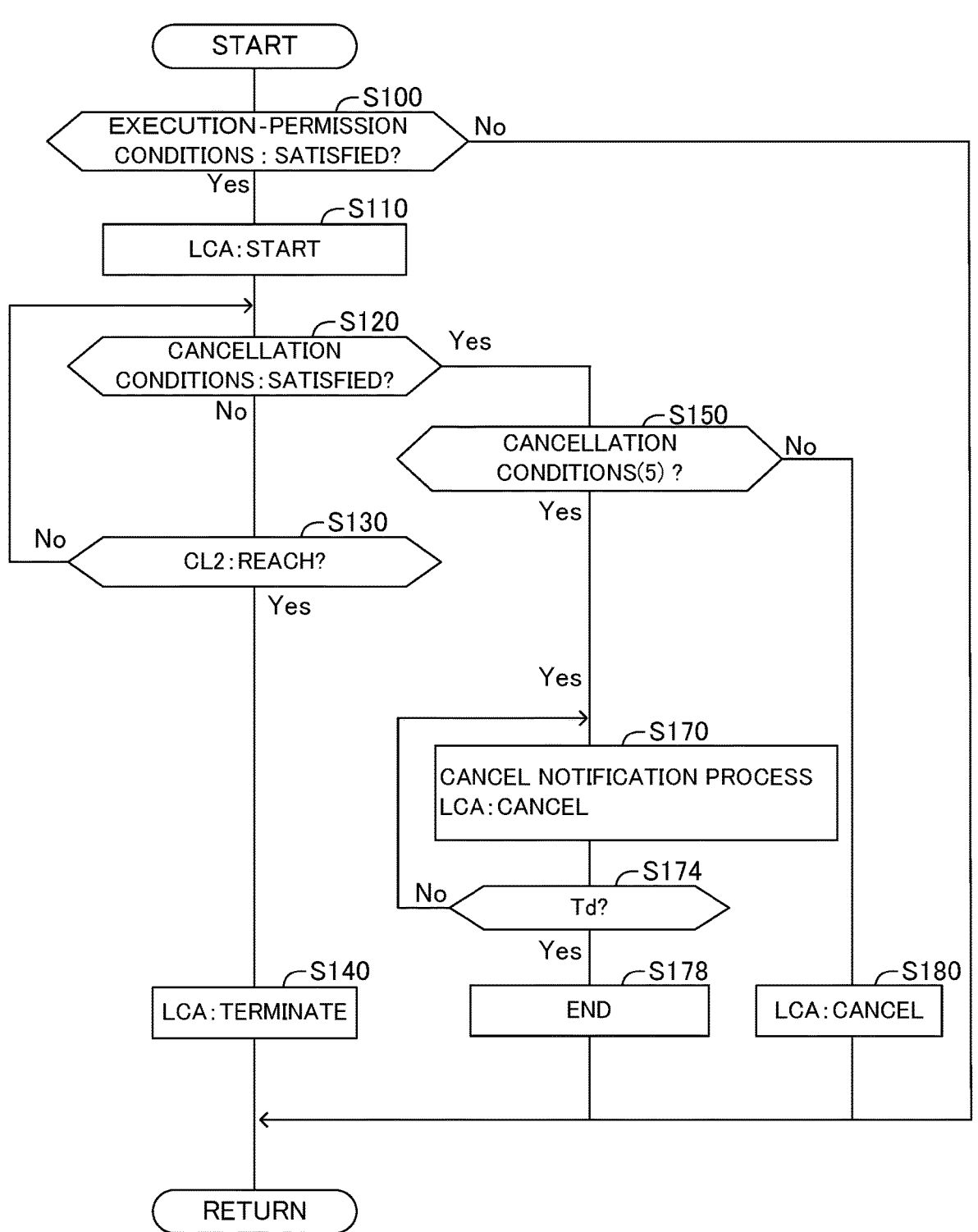
FIG. 5 is a flow chart for explaining a routine of LCA according to the modification 1.

FIG. 5 is a flow chart for explaining a routine of LCA according to the modification 1. In the modification 1, the process of step S160 shown in FIG. 4 is omitted in the above described embodiment. That is, in Modification 1 show in FIG. 5, when LCA is canceled due to the establishment of the cancellation condition (5), the cancel notification process is executed regardless of whether or not the rear vehicle VO has decelerated. In this case also, it is possible to effectively notify the drivers of the rear vehicle VO of the cancel of LCA of the own vehicle VH, and thus it is possible to achieve the same operation and effect as those of the above described embodiment.

Modification 2

Figure 6:
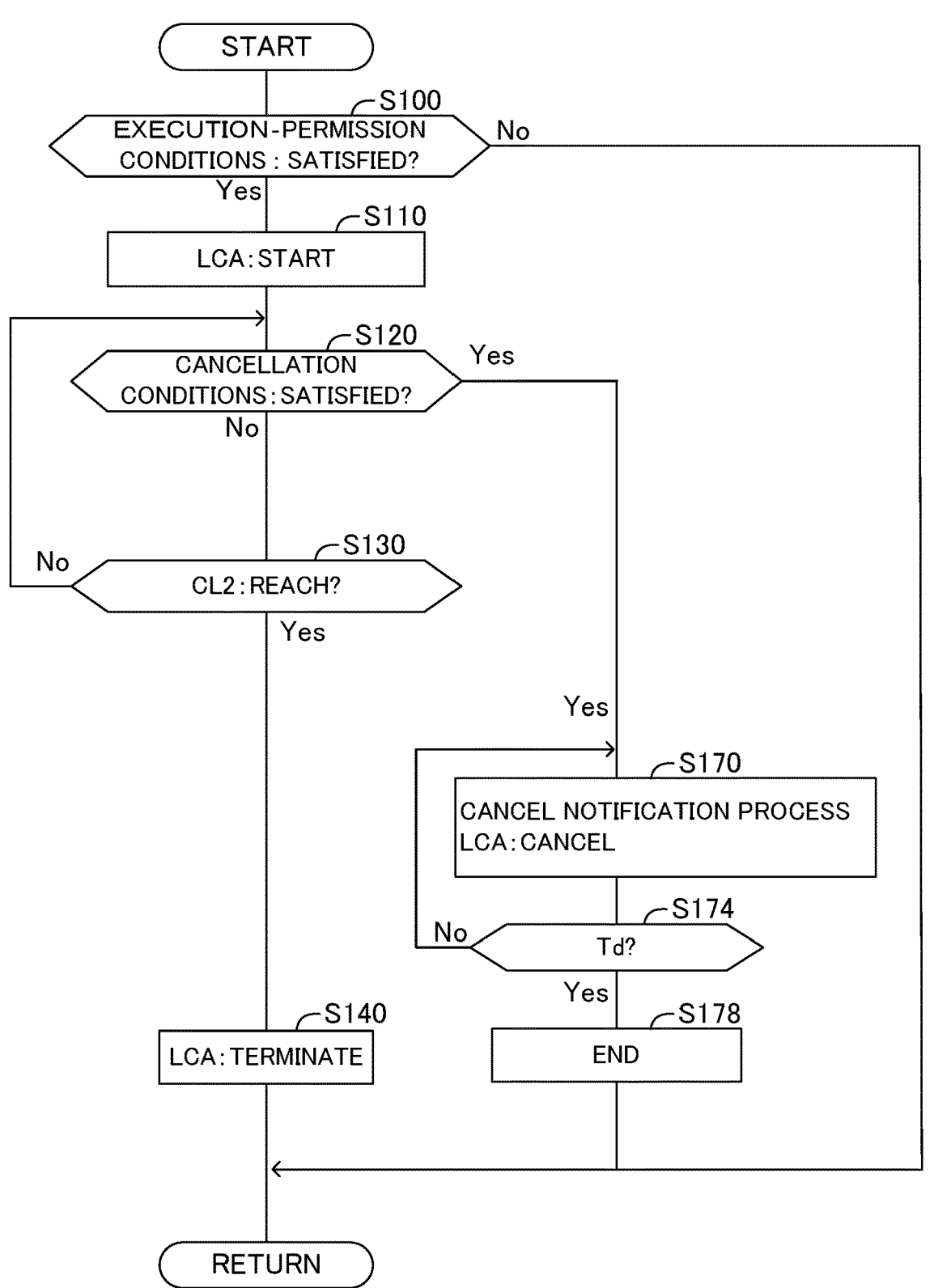
FIG. 6 is a flow chart for explaining a routine of LCA according to the modification 2.

FIG. 6 is a flow chart for explaining a routine of LCA according to the modification 2. In the modification 2, the process of step S150 and step S160 shown in FIG. 4 is omitted in the above described embodiment. That is, in Modification 2 shown in FIG. 6, when LCA is canceled due to the establishment of at least one of the cancellation conditions (1) to (5), the cancel notification process is executed regardless of whether or not the rear vehicle VO is present. In this case also, it is possible to effectively notify not only the driver of the rear vehicle VO but also the driver of the following vehicle traveling directly behind the own vehicle VH that LCA of the own vehicle VH is cancelled. Thus, for example, when the following vehicle is going to overtake the own vehicle VH, the driver of the following vehicle can grasp the cancel of LCA of the own vehicle VH at an early stage, and the following vehicle can smoothly overtake the own vehicle VH.

OTHER

Further, the application of the present disclosure can also be applied to the vehicle that automatically performs some or all of the driving operations.

What is claimed is:

1. A vehicle control device configured to execute a lane change assist control for automatically changing a lane from a lane traveling on an own vehicle to a target lane adjacent to the lane, wherein the vehicle control device is configured to:

cancel the lane change assist control, when a predetermined cancellation condition is satisfied during execution of the lane change assist control; and execute a cancel notification process for notifying the other vehicles of the fact that the lane change assist control has been canceled.

2. The vehicle control device according to claim 1, wherein the cancellation condition includes a specified cancellation condition that is established when a rear vehicle traveling in the target lane behind the own vehicle approaches the own vehicle, and wherein the vehicle control device is configured to execute the cancel notification process, when the specified cancellation condition is satisfied.

3. The vehicle control device according to claim 2, wherein the vehicle control device is configured to execute the cancel notification process, when the specified cancellation condition is satisfied and the deceleration of the rear vehicle is detected.

4. A vehicle control method which is applied to a vehicle, the vehicle comprising a control device configured to execute a lane change assist control for automatically changing a lane from a lane traveling on an own vehicle to a target lane adjacent to the lane, wherein the vehicle control method comprising:

canceling the lane change assist control, when a predetermined cancellation condition is satisfied during execution of the lane change assist control; and executing a cancel notification process for notifying the other vehicles of the fact that the lane change assist control has been canceled.

\* \* \* \* \*